United States Patent [19]

Koseki et al.

[11] Patent Number: 4,638,646

[45] Date of Patent: Jan. 27, 1987

[54] HEAT STORING APPARATUS

[75] Inventors: Yasuo Koseki, Hitachiohta; Akira Yamada, Hitachi; Hideki Kurokawa, Hitachi; Harumi Matsuzaki, Hitachi; Katsuya Ebara, Mito; Sankichi Takahashi, Hitachi, all of Japan

[73] Assignee: Hitachi, Ltd., Tokyo, Japan

[21] Appl. No.: 825,877

[22] Filed: Feb. 4, 1986

[30] Foreign Application Priority Data

Feb. 4, 1985 [JP] Japan ........ 60-18557

[51] Int. Cl.4 ........ F25B 17/02

[52] U.S. Cl. ........ 62/478; 62/119

[58] Field of Search ........ 62/119, 478

[56] References Cited

U.S. PATENT DOCUMENTS

| | | | |
|---|---|---|---|
| Re. 5,287 | 2/1873 | Carre | 62/478 |
| 1,740,737 | 12/1929 | Keith | 62/478 X |
| 3,411,318 | 11/1968 | Puckett | 62/478 |
| 4,169,362 | 10/1979 | Weil et al. | 62/478 |
| 4,199,952 | 4/1980 | Berg | 62/478 X |
| 4,205,531 | 6/1980 | Brunberg | 62/480 |
| 4,368,623 | 1/1983 | Knoche et al. | 62/478 X |

*Primary Examiner*—Lloyd L. King

*Attorney, Agent, or Firm*—Beall Law Offices

[57] ABSTRACT

An apparatus for storing heat energy in the form of chemical energy comprises a first container for a liquid medium containing a non-volatile solute and a second container for a liquid medium containing the solute in a different concentration from that of the medium in the first container. The containers are communicated through a pair of liquid repellent, porous membranes, so that only the vapor can enter the opposite container, while transferring heat energy.

11 Claims, 6 Drawing Figures

HEAT STORING APPARATUS

BACKGROUND OF THE INVENTION

2. Field of the Invention

The present invention relates to an apparatus for storing heat energy, which converts heat energy into chemical energy to store it, and which takes out heat energy when necessary, as heat or cold. Particularly, the invention relates to an apparatus for storing heat energy by using a liquid heat-storing medium.

2. Description of the Prior Art

To effectively utilize energy, attempts have heretofore been made to use natural energy such as solar energy and to use low-cost energy such as waste heat from the factories. However, the supply of heat of this sort is low in density and unreliable. Therefore, it is necessary to accumulate and store the low density energy so that it can be utilized.

With an air-conditioning apparatus which utilizes heat of the above-mentioned, it is desired to temporarily store heat and to take out heat as required. Here, heat energy to be taken out should produce a temperature as low as possible when cooling is to be effected and should produce a temperature as high as possible when heating is to be effected.

To store heat energy in the form of thermal motion includes (1) a method of utilizing the sensible heat (temperature difference), and (2) a method of utilizing the latent heat (phase transformation from solid to liquid, or from liquid to gas). To store the heat energy by converting it into chemical energy includes (3) a method of utilizing the heat of chemical reaction, (4) a method of utilizing the difference in concentration to obtain the heat of dilution from a concentrated liquid, and a combination thereof.

Among these methods, a heat-accumulating system which uses water or the like having a high specific heat to utilize sensible heat, has a low heat-accumulating density (amount of heat accumulated per unit weight of the heat-accumulating liquid). Therefore, a large heat accumulator must be employed with heat-insulating construction having high heat retaining property, resulting in increased cost of manufacturing the apparatus. With a system which utilizes the heat of fusion of a solid material, the heat-accumulating density may be large. In the phase transformation from liquid into solid, the liquid is difficult to solidify due to supercooling, and is difficult to liquefy due to superheating. Moreover, the solid conducts the heat poorly, which makes the apparatus bulky.

With a system which stores energy in the form of thermal motion, the temperature level in principle is the same between when the heat is to be stored and when the heat is to be taken out. In practice, therefore, the temperature level decreases when the heat is taken out compared with when the heat is stored due to radiation of heat, temperature drop in exchanging heat and the like. At the time of utilizing heat, it is not allowed to change the temperature to meet the purpose. Besides, to accumulate heat, it is necessary to employ a heat-insulating construction having high heat retaining property to prevent the heat from being radiated.

According to the system which accumulates heat by converting heat energy into chemical energy, the energy can be stored at a relatively low temperature. Therefore, energy can be stored while greatly preventing the heat from radiating; i.e., energy can be stored for extended periods of time, presenting an advantage compared with the systems which utilize sensible heat or latent heat.

Japanese Patent Laid-Open No. 157995/1982 discloses a heat accumulator which employs a hydrophobic porous material. This is an apparatus which converts the heat energy into chemical energy to store it by utilizing heat of formation of a compound and heat of decomposition. In a reaction vessel in which the compound is formed or decomposed, there is provided a heat exchanger to exchange the heat produced by the reaction of the absorbing agent (NaI) with the coolant ($NH_3$ gas) or the heat of decomposition of $NaI.nNH_3$. A gas chamber for a coolant gas and an absorbing agent (NaI) reservoir are separated by a wall composed of a water-repellent porous material which permits the coolant gas to pass through but which does not permit an absorbing agent (NaI) to pass through based upon the water-repelling action. A reservoir vessel for storing the coolant (liquid $NH_3$) accommodates a heat exchanger which exchanges the heat of condensation of the coolant and the heat of vaporization between the coolant and the absorbing agent, and has a heat-exchanging coil that surrounds the reservoir vessel to heat the coolant. This method does not require the broad space for spraying the liquid that was necessary in the conventional art, and enables the heat exchanger and the absorbing agent to be contained in a unitary form. However, the porous material is not allowed to be utilized on the side of the coolant because of the reasons mentioned below, and it is difficult to uniformly vaporize the coolant, imposing limitations on reducing the size of the apparatus. Furthermore, it is not allowed to utilize the porous material on the side of the coolant since it is not capable of preventing the droplets from spraying when the coolant is generated.

SUMMARY OF THE INVENTION

The object of the present invention is to provide an apparatus for storing heat energy by effectively using a membrane or porous material through which only vapor is allowed to transfer from a heat intake chamber to a heat storing chamber. According to the apparatus, the vapor can be efficiently generated and absorbed, enabling the apparatus to be realized in a small size, facilitating the operation and saving energy.

The present invention provides:

heat storing apparatus comprising, (1) first container for a first medium which absorbs and desorbs a vapor component;

(2) second container for storing a second medium which absorbs and desorbs the vapor component;

(3) means for communicating said first and second storing means with a vapor-passage;

(4) first membrane means which is in contact with said first medium, for separating vapor of said vapor component and liquid in either of said first medium or second medium, or both;

(5) second membrane means which is in contact with said second medium, for separating the vapor of said vapor component and liquid in either of said first medium or second medium, or both; and (6) means for supplying heat to said first medium so as to effect vaporization of said vapor component in said first medium, whereby only the vapor is transferred to said second medium through said first and second membrane means; wherein said first medium and second medium have a boiling point higher than that of said vapor component.

DETAILED DESCRIPTION OF THE PREFERRED EMBODIMENTS

The function of a hydrophobic or water-repellent porous material in heat accumulation will be described below.

A heat-accumulating liquid or an aqueous solution containing a non-volatile solute such as LiBr exists only on one side of the porous material. The liquid is not allowed to come out of the pores of the porous material but the water vapor only is permitted to enter into or come out of the pores. This is because the heat-accumulating liquid is retained by the hydrophobic porous material which permits a gas (vapor) to easily pass through but which has no affinity for liquid or the aqueous solution and which inhibits the liquid from passing. Though the liquid is not permitted to pass through, the vapor is permitted to freely enter into the heat-accumulating liquid from the vapor chamber or a vapor passage through pores of the porous material, and the vapor generated from the surface of he heat-accumulating liquid is permitted to move into the vapor chamber through the pores. There exists no problem when the vapor generated from the heat-accumulating liquid goes into the vapor chamber. When the vapor passing through the pores come into contact with the heat-accumulating liquid and is absorbed and condensed, however, it is essential that the vapor does not condense on the surface of the porous material. In the case of, for example, a lithium bromide aqueous solution, which absorbs the water vapor, the water vapor generated under a preseure Pc condenses on the surface of the porous material at a condensation temperature Ts of water, but the absorption temperature Ts' is considerably higher than Ts and than the operation temperature $T_L$. Therefore, if the heat-accumulating liquid and the porous material are maintained at the operation temperature $T_L$ ($Ts' > T_L > Ts$), the water vapor passes through the pores without condensing ($T_L > Ts$) on the surface of the porous material, and is condensed and absorbed ($T_L > Ts'$) on the surface of the heat-accumulating liquid.

Figure 1:
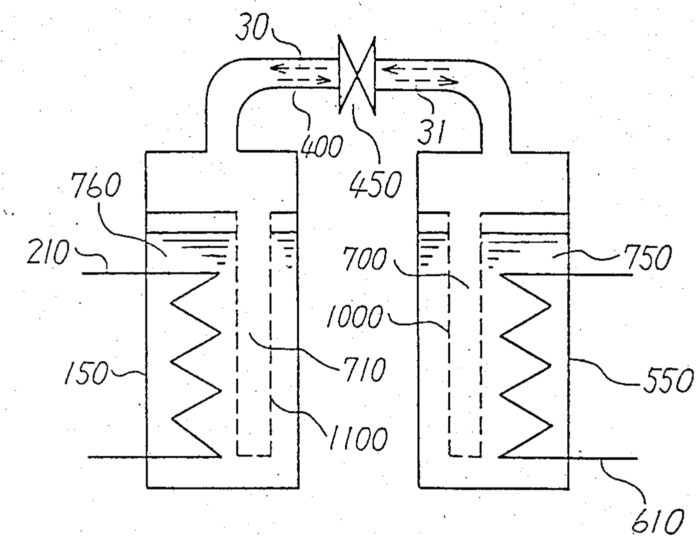
FIG. 1 is a diagram showing the fundamental construction of an apparatus for accumulating heat according to the present invention.

The invention will be described below by way of an embodiment. FIG. 1 shows the fundamental structure of a heat-storing apparatus according to the present invention. In the apparatus, a first container or a heat-accumulating liquid tank 550 having heat-exchanging function is communicated with a second container 150 via a vapor path 400. The heat-accumulating liquid tank 550 contains an aqueous solution of LiBr 750 and a vapor chamber 700 that are partitioned by a lyophobic porous material 1000. The liquid tank 550 is provided with a heat transmission pipe 610 installed near the porous material 1000, and the heat-accumulating liquid 750 exists therebetween. The vapor chamber 700 is communicated with a vapor chamber 710 in the second container tank 150 via the vapor path 400 having a valve 450. The second container 150 also contains a heat accumulating liquid 760 and the vapor chamber 710 that are partitioned by a lyophobic porous material 1100. In the second container 150, a heat transmission pipe 210 is installed near the porous material 1100, and an aqueous solution 15 exists therebetween. The aqueous solution 750 in the first container 550 has a higher concentration than the aqueous solution 760 in the second container 150.

Figure 2:
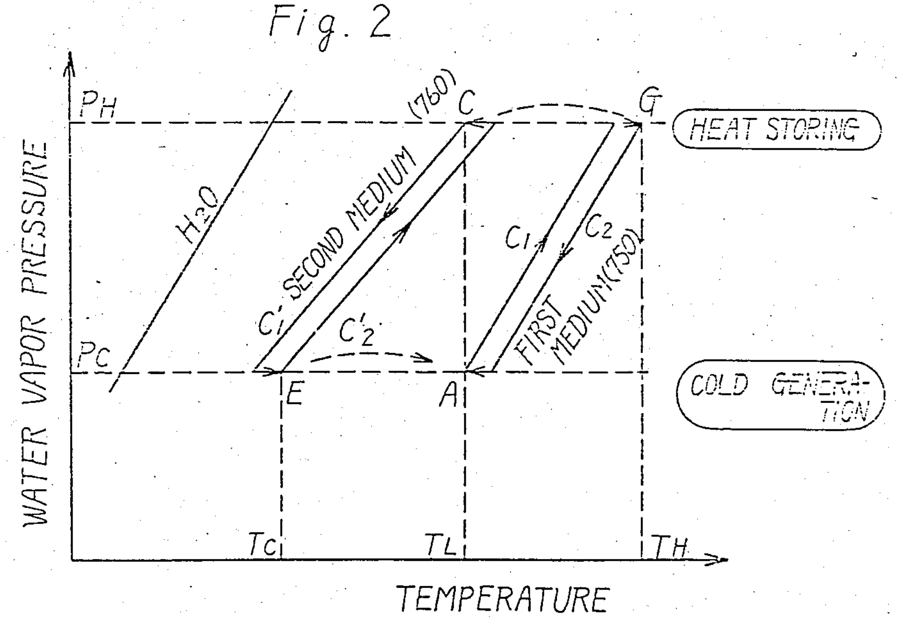
FIG. 2 is a drawing of vapor pressure which corresponds to the heat-accumulating operation.

FIG. 2 is a drawing of water vapor pressure of a lithium bromide aqueous solution, wherein the abscissa represents the temperature and the ordinate represents equilibrium water vapor pressure. The lithium bromide aqueous solution produces the vapor pressure which decreases with the increase in the concentration therof. The vapor pressures of water, the aqueous solution 760 and the aqueous solution 750 are arranged as shown in FIG. 2.

The heat-accumulating operation is carried out as described below. First, the heat-accumulating liquid 750 in the heat-accumulating liquid tank 550 is heated by the heat transmission pipe 610. When heated at a temperature $T_H$, the water evaporates on the surface of the lyophobic porous material which is in contact with the liquid to constitute a vapor/liquid interface, and the concentration increases from $C_1$ to $C_2$ (point G in FIG. 2). The water vapor enters the vapor chamber 700 through the lyophobic porous material 1000, and further enters the vapor chamber 710 in the second container 150 via the vapor path 400. The water vapor 30 which has entered the vapor chamber 710 reaches the medium 760 through pores of the lyophobic porous material 1100, and is absorbed and dilutes the medium 760. When the vapor is absorbed, heat is generated owing to latent heat of condensation. During heat accumulation the heat transmission pipe 210 cools the medium 760 to maintaine its temperature at $T_L$ (point C in FIG. 2). The medium 760 which has absorbed the water vapor, on the other hand, is diluted and its concentration decreases from $C_2'$ to $C_1'$. When the heat is accumulated, the pressure in the vapor chamber becomes PH which is equal to an equilibrium water vapor pressure of the medium 760 of the concentration $C_1'$ at the temperature $T_L$. Through the above-mentioned operation, the heat energy of temperature $T_H$ is recovered as the latent heat of vaporization of water, converted (concentrated) into the energy of concentration of the heat-accumulating liquid thereby to accumulate heat energy. To store the energy, the valve 450 in the vapor path 400 is closed to shut off the side of the concentrated heat-accumulating liquid 750 from the side of the diluted medium 760.

When the cold 750 is required, the heat-accumulating liquid 750 in the heat-accumulating liquid tank 550 is cooled by the heat transmission pipe 610 down to the temperature $T_L$. The water vapor pressure decreases, and the water vapor in the vapor chamber 700 is absorbed so that the pressure decreases (G→A in FIG. 2). Then, when the valve 450 of the vapor path 400 is opened, the pressure decreases in the vapor chamber 710 of the medium tank 150, whereby the medium 760 evaporates. Therefore, the temperature of the liquid 760 decreases due to latent heat of evaporation (C→E in FIG. 2). The water vapor 31 generated from the surface of the lyophobic porous material 1100 which forms the vapor/liquid interface of medium 760, enters the vapor chamber 710 via pores, and is absorbed by the heat-accumulating liquid 750 via the vapor path 400. When the vapor is absorbed, concentration of the heat-accumulating liquid 750 decreases from $C_2$ to $C_1$, and the heat is produced due to latent heat of condensation. However, the liquid 750 is cooled by the heat transmission pipe 610, and the temperature $T_L$ is maintained (point A in FIG. 2). Since the pressure is decreased, the medium 760 evaporates spontaneously, whereby concentration increases from $C_1'$ to $C_2'$ and the temperature decreases due to latent heat of evaporation. Here, the cold is taken out by the heat transmission pipe 210, and the temperature decreases to Tc (point E in FIG. 2), so that cold is obtained from the heat transmission pipe 210 of the medium tank 150. When cold is generated, the pressure in the vapor chambers 700 and 710 becomes $P_C$ which is equal to the equilibrium water vapor pressure of the heat-accumulating liquid 750 of the concentration $C_1$ at the temperature $T_L$.

In the foregoing is described the case where cold is generated. When a heat is required, the high temperature heat is obtained from the heat transmission pipe 610 in the heat-accumulating liquid tank 550 by supplying heat to medium 70 via heat transmission pipe 210. In this case, an amount of heat energy supplied is quite small, which can make a pressure difference between the containers 550 and 150. Since the apparatus is air-tightly sealed from the atmosphere and kept under the reduced pressure such as 100 mmHg, preferably 50 mmHg or less, the evaporation of vapor easily takes place.

The lyophobic porous material used in the present invention has non-affinity (lyophobic) for the heat-accumulating liquid, and, strictly speaking, need not necessarily be hydrophobic. Namely, the porous material should have little affinity for the heat-accumulating liquid. Therefore, a hydrophobic porous material should be used for the hydrophilic heat-accumulating liquid, and a hydrophilic porous material should be used for a hydrophobic heat-accumulating liquid. Specifically, a heat-accumulating liquid of the water type such as lithium bromide aqueous solution and a heat-accumulating liquid of the ammonia type such as methylamine are hydrophilic, and to which the hydrophobic porous materials are adapted. Conversely, the heat-accumulating liquids of the freon type such as R-21, R-22 are hydrophobic, and to which hydrophilic porous materials are adapted. Examples of the hydrophobic porous material adapted to the present invention include (1) polyalkylene, (2) silicone type material (particularly preferably, a silicone resin which may be in the form of an oil or a rubber), and (3) fluorinated polymer materials (for example, a polytetrafluoroethylene or a copolymer of fluoroethylene and a vinyl monomer such as ethylene, propylene or vinylidene fluoride, or an acrylic polymers of which the terminals are constituted by perfluoro groups). Further, sintered alloys treated with a hydrophobic material and porous non-woven fabrics which are coated with the above-mentioned compounds are usable.

Even hydrophilic porous material such as cellulose acetate (acetylcellulose), cellulose nitrate (nitrocellulose), cellulose-mixed ester or the like may be used when they are subjecting treatment with the hydrophobic materials to impart hydrophilic property. If a liquid medium is not aqueous, hydrophilic porous materials may be used as they are.

In one example, the porous material should have a pore diameter of about 0.1 μm to about 5 μm. This is because the flow resistance increases drastically when the water vapor passes through the pores if the pore diameter is smaller than 0.1 μm. If the porous diameter is greater than 5 μm, the liquid comes out of the pores. Further, the rate (porosity) at which the pores occupy the porous material should range from about 30% to about 80%. If the porosity is too small, the flow resistance of water vapor passing through the pores increases, and the sectional area for flowing the vapor decreases causing the amount of transmission to decrease. If the porosity is too great, the porous material loses strength and becomes dense due to the pressure of fluid. Therefore, the porosity decreases, or the porous material is destroyed.

According to the method which utilizes the difference of concentration, heat-accumulating density can be increased relaying upon both the heat of dilution and the heat of condensation. For this purpose, the heat-accumulating agent should have the property of absorbing the vapor. Namely, use can be made of a liquid absorbing agent employed for an absorption refrigerating machine, or a solid absorbing agent such as zeolite. However, the latter agent which is of the solid form (usually granular form) has poor heat-exchanging performance, and is charged poorly into the apparatus making it necessary to construct the apparatus in large size. Therefore, the liquid absorbing agent is suited. The liquid absorbing agent is selected depending upon the kind of vapor which moves. Examples of the water type include aqueous solutions of salts such as lithium bromide, lithium chloride, and lithium iodide, and of sodium hydroxide or of sulfuric acid. Examples of the ammonia type include ammonia, methylamine and ethylamine that serve as moving vapor, and examples of the absorbing agent include water and a solution of sodium iodide. Examples of the freon type include chiefly R-21, R-22 that serve as moving vapor, and examples of the absorbing agent include tetraethylene glycol, dimethyl ether (E 181), dimethylformamide (D.M.F.), isobutyl acetate (I.B.M.), and butyl phthalate (D.B.P.).

The above-mentioned heat-accumulating agent can be used as the absorbing medium having a boiling point lower than that of the heat-accumulating agent.

As an example which utilizes the heat of chemical reaction, there is a method which uses such a substance as sodium sulfide or potassium hydroxide for the heat-accumulating liquid and which accumulates the heat by utilizing the reversible thermal chemical reaction based upon the heat that is generated when the heat-accumulating liquid is decomposed or is formed. The medium used in this method may be an aqueous solution of magnesium chloride or the like. However, use can also be made of a dilute aqueous solution of sodium sulfide or potassium hydroxide for the heat-accumulating liquid.

An embodiment will be described below with reference to a concretely constructed apparatus. According to the invention, a heat-accumulating liquid tank 550 has a shape which is the same as that of an absorbing medium tank 150, and their size changes depending simply upon the amount of liquid to be stored. The construction will be described hereinbelow with reference to the tank for storing heat-accumulating liquid.

Figure 3A:
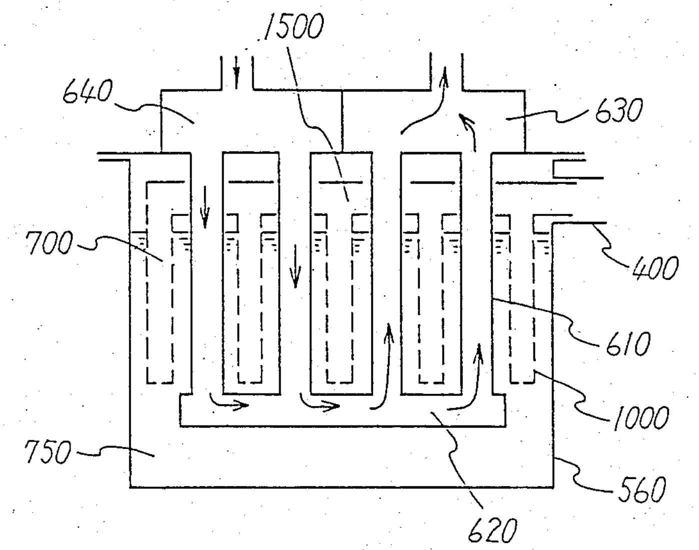
FIG. 3 is a diagram illustrating an embodiment of the present invention, wherein FIG. 3(*a*) is a vertical sectional view of the apparatus for accumulating heat, and FIG. 3(*b*) is a horizontal sectional view thereof.
Figure 3B:
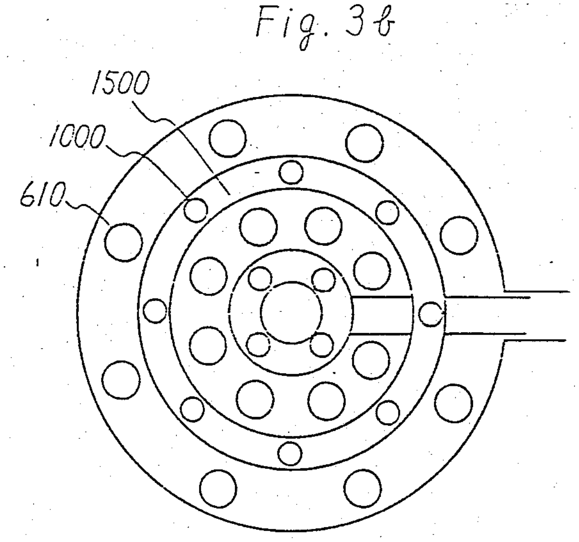

FIG. 3(*a*) is a vertical sectional view of the tank for storing heat-accumulating liquid employing tubular porous materials (porous pipes) 1000, and FIG. 3(*b*) is a horizontal sectional view thereof. In a vessel 560 are vertically arranged many heat transmission pipes 610 which are collected together at their lower portions by a manifold 620, and which are connected at their upper portions to an inlet liquid chamber 640 and to an outlet liquid chamber 630. Many porous pipes 1000 are arranged among the heat transmission pipes 610 as shown in FIGS. 3(*a*),(*b*), the lower portions thereof being closed, and the upper portions thereof being collected by a circular manifold 1500 and communicated with a vapor path 400. A heat-accumulating liquid 20 is charged into a liquid chamber 750 formed in the vessel 560 outside the heat transmission pipes 610 and porous pipes 1000. Vapor chambers 700 are formed in the porous pipes 1000 and in the manifold 1500 of which the end is detachably inserted in the vapor path 400. The feature of this construction resides in that the heat transmission pipes 610 and porous pipes 1000 are alternately arranged and are close to each other to reduce the thickness of the heat-accumulating liquid that exists therebetween in order to increase the heat exchanging performance, and that a group of heat transmission pipes and a group of porous pipes are permitted to be easily taken out from the upper side to facilitate the disassembling and maintenance of the apparatus.

Figure 4A:
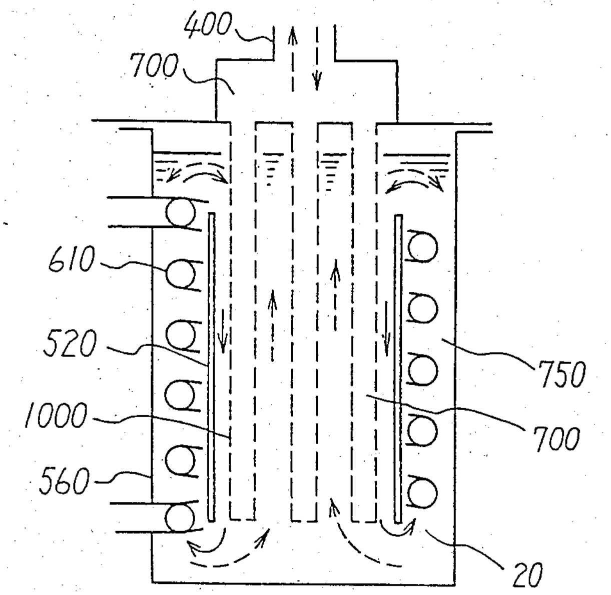
FIG. 4 is a diagram illustrating another embodiment of the present invention, wherein FIG. 4(*a*) is a vertical sectional view of the apparatus for accumulating heat, and FIG. 4(*b*) is a horizontal sectional view thereof.
Figure 4B:
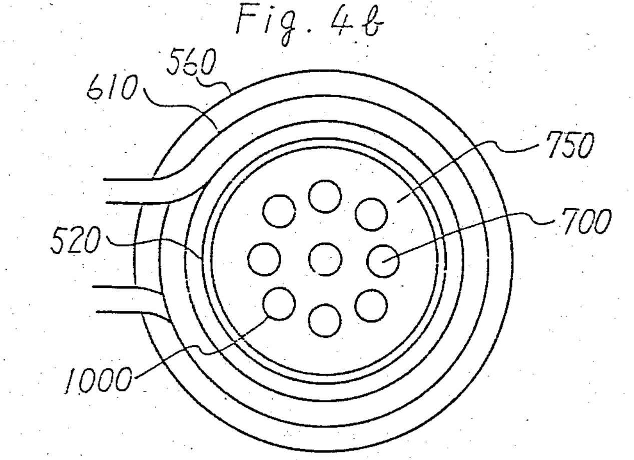

FIG. 4 shows another embodiment, wherein FIG. 4(*a*) is a vertical sectional view of the tank for storing heat-accumulating liquid, which is constituted by the vertically arranged porous pipes 1000 and the heat transmission pipe 610 of the form of a coil, and FIG. 4(*b*) is a horizontal sectional view thereof. In the center of the vessel 560 are vertically arranged a number of porous pipes 1000 of which the ends on one side are closed, the upper portions thereof being communicated with the gas chamber 700. The heat transmission pipe 610 is wound around the vessel like a coil, and a cylindrical guide plate 520 is installed between a group of heat transmission pipes 610 and a group of porous pipes. The heat-accumulating liquid 20 fills the liquid chamber 750 formed in the vessel 560 outside the porous pipes 1100 and the heat transmission pipes 610. The guide plate 520 is submerged sufficiently in the liquid. The feature of this construction resides in that the heat-accumulating liquid is allowed to flow by natural convection to increase the heat-exchanging performance between the heat-accumulating liquid and the heat transmission pipes, and to promote the evaporation and condensation on the surfaces of porous pipes. Namely, the liquid has a decreased specific gravity and becomes lighter as the temperature increases and, conversely, becomes heavy as the temperature decreases. Therefore, the liquid which is heated from one side and which is cooled from the other side, starts to flow due to the difference in the specific gravity.

In the tank for storing heat-accumulating liquid of the present invention, the heat transmission pipes form a heating portion and the porous pipes form a cooling portion based upon the evaporation of liquid when the heat is to be accumulated, and conversely the heat transmission pipes form a cooling portion and the porous pipes form a heating portion based upon the absorption of vapor when cold heat is to be generated. By separating the group of heat transmission pipes and the group of porous pipes into the right side and the left side using guide plate 520, therefore, the heat-accumulating liquid flows due to the temperature difference (difference in the specific gravity) therebetween. In the embodiment of FIGS. 4(*a*), (*b*), the group of heat transmission pipes are arranged along the periphery in the vessel and the group of porous pipes are arranged in the central portion being partitioned by the guide plate. According to this construction, when heat is to be accumulated, an ascending stream is produced by the group of heat transmission pipes that form the heating portion, and the descending stream is produced by the group of porous pipes that form the cooling (heat-absorbing) portion, so that the liquid circulates (solid arrows in FIG. 4). When the cold heat is generated, on the other hand, the descending stream is produced by the group of heat transmission pipes that form the cooling portion, and the ascending stream is produced by the group of porous pipes that form the heating (heat-generating) portion, so that the liquid circulates (dotted arrows in FIG. 4).

In the foregoing were mentioned embodiments using tubular porous materials. It should, however, be noted that the invention can also be put into practice by using flat film-like porous materials.

According to the present invention, a porous material on the both side of the heat intake medium and the heat-accumulating liquid, makes it possible to reduce the size of the apparatus, and to increase heat-accumulating efficiency.

What we claim is:

1. A heat storing apparatus comprising:

(1) first container for a first medium which absorbs and desorbs a vapor component;

(2) second container for storing a second medium which absorbs and desorbs the vapor component;

(3) means for communicating said first and second storing means with a vapor-passage;

(4) first membrane means which is in contact with said first medium, for separating vapor of said vapor component and liquid in either of said first medium or second medium, or both;

(5) second membrane means which is in contact with said second medium, for separating the vapor of said vapor component and liquid in either of said first medium or second medium, or both; and (6) means for supplying heat to said first medium so as to effect vaporization of said vapor component in said first medium, whereby only the vapor is transferred to said second medium through said first and second membrane means;

wherein said first medium and second medium have a boiling point higher than that of said vapor component.

2. A heat storing apparatus according to claim 1, which further comprises means for interrupting said vapor passage so as to maintain the heat energy stored in said second medium.

3. A heat storing apparatus according to claim 1, wherein at least one of said membrane means has a membrane made of a water repellent, porous material which is capable of passing only vapor.

4. A heat storing apparatus according to claim 1, which further comprises means for supplying heat to said second medium so as to desorb the vapor component absorbed in said second medium, whereby the vapor is fed to said first medium through said first and second membrane means.

5. A heat storing apparatus comprising:

(1) first means for enclosing a first medium which absorbs and desorbs vapor of a vapor component in said first medium;
(2) second means for storing a second medium which absorbs and desorbs the vapor;
(3) first membrane means which is in contact with said first medium, for separating the vapor from liquid in either of said first medium or second medium, or both;
(4) second membrane means which is in contact with said second medium, for separating the vapor from the liquid in said second medium;
(5) means for communicating said first and second enclosing means through said first and second membrane means;
(6) means for supplying heat to said first medium to effect vaporization of said vapor component in said first medium; and
(7) means for supplying heat to said second medium so as to release the vapor component absorbed in said second medium, thereby returning the vapor to said first medium through said first and second membrane means;

wherein said first medium and second medium have a boiling point higher than that of said vapor component.

6. A heat storing apparatus according to claim 5, wherein at least one of said first and second medium is an aqueous solution containing a non-volatile solute, and said first and second membrane means have a membrane made of a water repellent, porous material which is capable of passing only the vapor.

7. A heat storing apparatus according to claim 6, which further comprises means for interrupting said communicating means, thereby to maintain the state where the vapor is absorbed in said second medium.

8. A heat storing apparatus according to claim 6, wherein said enveloping means and communicating means are air-tightly sealed, whereby they are kept under the reduced pressure.

9. An apparatus for storing heat energy in the form of chemical energy comprising:
(1) first means for enclosing a first medium which is an aqueous solution containing a non-volatile solute in a first concentration;
(2) second means for enclosing a second medium which is an aqueous solution containing the solute in a second concentration substantially smaller than the first concentration;
(3) first membrane means having a membrane of water repellent, porous material for separating vapor of water from water and having a hollow portion for a vapor passage, said first membrane means being immersed in said first medium;
(4) second membrane means having the membrane and having the hollow portion, said second membrane means being immersed in said second medium;
(5) means for communicating said hollow portions through said membrane means; (
6) means for supplying heat to said first medium to vaporize water in said first medium so as to further increase in the first concentration, so that the water vapor is absorbed in said second medium through said membrane means to lower the second concentration;
(7) means for interrupting said communicating means so as to maintain the state where the water vapor is absorbed; and
(8) means for supplying heat to the second medium to vaporize the water vapor from said second medium.

10. An apparatus according to claim 9, wherein the membrane is made of polytetetrafuluoroethylene.

11. An apparatus for storing heat energy in the form of chemical energy comprising:
(1) first means for enclosing a first medium which is an aqueous solution containing a non-volatile solute in a first concentration;
(2) second means for enclosing a second medium which is an aqueous solution containing the solute in a second concentration substantially smaller than the first concentration;
(3) a first group of membranes each made of water repellent, porous material for separating water vapor and having a hollow portion for a vapor passage, said membranes being immersed in said first medium;
(4) a second group of membranes each made of the material and having the hollow portion, said second membrane means being immersed in said second medium;
(5) means for communicating said hollow portions through said membranes;
(6) means for supplying heat to vaporize water in said first medium so as to further increase the first concentration, so that the water vapor is absorbed in said second medium through said membrane means to lower the second concentration;
(7) means for interrupting said communicating means so as to maintain the state where the water vapor is absorbed; and
(8) means for supplying heat to the second medium to vaporize the water vapor from said second medium, whereby the vapor is fed to said first medium.

* * * * *